US012349736B2

(12) United States Patent
Borkovec et al.

(10) Patent No.: US 12,349,736 B2
(45) Date of Patent: Jul. 8, 2025

(54) ELECTRONIC SMOKING DEVICE

(71) Applicant: FONTEM VENTURES B.V., Amsterdam (NL)

(72) Inventors: Vaclav Borkovec, Hamburg (DE); Thorben Rehders, Hamburg (DE)

(73) Assignee: FONTEM VENTURES B.V., Amsterdam (NL)

( * ) Notice: Subject to any disclaimer, the term of this patent is extended or adjusted under 35 U.S.C. 154(b) by 260 days.

(21) Appl. No.: 18/069,483

(22) Filed: Dec. 21, 2022

(65) Prior Publication Data

US 2023/0119000 A1 Apr. 20, 2023

Related U.S. Application Data

(63) Continuation of application No. 17/115,601, filed on Dec. 8, 2020, now Pat. No. 11,553,736, which is a (Continued)

(30) Foreign Application Priority Data

Aug. 6, 2013 (EP) .................................... 13003929

(51) Int. Cl.
*A24F 47/00* (2020.01)
*A24F 40/40* (2020.01)
(Continued)

(52) U.S. Cl.
CPC .............. *A24F 40/50* (2020.01); *A24F 40/40* (2020.01); *A24F 40/90* (2020.01); *H05B 1/0202* (2013.01);
(Continued)

(58) Field of Classification Search
CPC .......... A24F 40/10; A24F 40/40; A24F 40/42; A24F 40/90
See application file for complete search history.

(56) References Cited

U.S. PATENT DOCUMENTS

| | | | |
|---|---|---|---|
| 251,340 | A | 12/1881 | Ginter |
| 2,267,966 | A | 12/1941 | Allen |

(Continued)

FOREIGN PATENT DOCUMENTS

| | | | |
|---|---|---|---|
| CN | 101557728 | A | 10/2009 |
| CN | 201379073 | Y | 1/2010 |

(Continued)

OTHER PUBLICATIONS

Epo, extended European Search Report, for Application No. EP22206904.9; Mail date Feb. 27, 2023, 6 pages.

(Continued)

*Primary Examiner* — Eric Yaary
(74) *Attorney, Agent, or Firm* — Perkins Coie LLP; Kenneth H. Ohriner

(57) ABSTRACT

An electronic smoking device includes an elongate housing sleeve accommodating at least part of the following components: a battery as an electric power source powering an electrically activatable atomizer including an electric heater adapted to atomize a liquid supplied from a reservoir to provide an aerosol exiting from the atomizer; a puff detector adapted to indicate an aerosol inhaling puff; and control electronics connected to the puff detector and adapted to control the heater of the atomizer. At least part of the battery, the puff detector, the control electronics and/or the atomizer is mounted on an elongate insert permitting lateral access and fitting into the housing sleeve via one of the ends of the housing sleeve.

6 Claims, 2 Drawing Sheets

Related U.S. Application Data continuation of application No. 16/666,052, filed on Oct. 28, 2019, now Pat. No. 11,202,471, which is a continuation of application No. 14/910,618, filed as application No. PCT/EP2014/001936 on Jul. 15, 2014, now Pat. No. 10,492,529.

(51) Int. Cl.

| | |
|---|---|
| ***A24F 40/50*** | (2020.01) |
| ***A24F 40/90*** | (2020.01) |
| ***H05B 1/02*** | (2006.01) |
| ***H05B 3/00*** | (2006.01) |
| *A24F 40/10* | (2020.01) |

(52) U.S. Cl.

CPC ......... *H05B 1/0244* (2013.01); *H05B 3/0014* (2013.01); *A24F 40/10* (2020.01)

(56) References Cited

U.S. PATENT DOCUMENTS

| | | | | |
|---|---|---|---|---|
| H1271 | H | 1/1994 | Shouse | |
| 6,125,853 | A | 10/2000 | Susa | |
| D532,927 | S | 11/2006 | Sann | |
| 7,726,320 | B2 | 6/2010 | Robinson | |
| D675,777 | S | 2/2013 | Wu | |
| D720,882 | S | 1/2015 | Albanese | |
| D721,202 | S | 1/2015 | Liu | |
| 9,623,205 | B2 | 4/2017 | Buchberger | |
| 9,801,505 | B2 | 10/2017 | Buckalter et al. | |
| 9,894,931 | B2 | 2/2018 | Zhou | |
| 10,058,122 | B2 | 8/2018 | Steingraber et al. | |
| 2005/0016553 | A1 | 1/2005 | Iannuzzi et al. | |
| 2005/0034723 | A1 | 2/2005 | Bennett et al. | |
| 2005/0268911 | A1 | 12/2005 | Cross et al. | |
| 2008/0257367 | A1 | 10/2008 | Paterno et al. | |
| 2009/0095287 | A1 | 4/2009 | Emarlou | |
| 2010/0307518 | A1 | 12/2010 | Wang | |
| 2011/0011396 | A1 | 1/2011 | Fang | |
| 2011/0277757 | A1 | 11/2011 | Terry | |
| 2011/0277760 | A1 | 11/2011 | Terry | |
| 2011/0304282 | A1 | 12/2011 | Li et al. | |
| 2012/0199146 | A1 | 8/2012 | Marangos | |
| 2012/0199663 | A1 | 8/2012 | Qiu | |
| 2013/0042865 | A1 | 2/2013 | Monsees et al. | |
| 2013/0199528 | A1 | 8/2013 | Goodman et al. | |
| 2013/0220315 | A1* | 8/2013 | Conley | A24F 40/42 128/202.21 |
| 2013/0228191 | A1* | 9/2013 | Newton | A61M 15/06 131/329 |
| 2013/0298905 | A1 | 11/2013 | Levin et al. | |
| 2013/0312742 | A1 | 11/2013 | Monsees et al. | |
| 2013/0333711 | A1 | 12/2013 | Liu | |
| 2014/0060555 | A1 | 3/2014 | Chang | |
| 2014/0083443 | A1 | 3/2014 | Liu | |
| 2014/0174458 | A1 | 6/2014 | Katz | |
| 2014/0182612 | A1 | 7/2014 | Chen | |
| 2014/0196732 | A1 | 7/2014 | Liu | |
| 2014/0270729 | A1 | 9/2014 | Depiano et al. | |
| 2014/0311506 | A1 | 10/2014 | Liu | |
| 2014/0360517 | A1 | 12/2014 | Taggart et al. | |
| 2014/0363145 | A1* | 12/2014 | Plojoux | A61M 15/06 392/386 |
| 2014/0366900 | A1 | 12/2014 | Plojoux et al. | |
| 2015/0020832 | A1 | 1/2015 | Greim | |
| 2015/0027460 | A1 | 1/2015 | Liu | |
| 2015/0047660 | A1* | 2/2015 | Liu | H02J 7/0042 320/107 |
| 2015/0245660 | A1 | 9/2015 | Lord | |
| 2015/0257451 | A1 | 9/2015 | Brannon et al. | |
| 2016/0113325 | A1 | 4/2016 | Liu | |
| 2017/0094998 | A1 | 4/2017 | Bernauer et al. | |

FOREIGN PATENT DOCUMENTS

| | | | |
|---|---|---|---|
| CN | 201528661 | U | 7/2010 |
| CN | 201830899 | U | 5/2011 |
| CN | 202112305 | U | 1/2012 |
| CN | 202445137 | U | 3/2012 |
| CN | 202456412 | U | 3/2012 |
| CN | 202941411 | U | 10/2012 |
| CN | 202958805 | U | 6/2013 |
| CN | 203353689 | U | 12/2013 |
| EP | 280262 | A2 | 8/1988 |
| EP | 299272 | A2 | 1/1989 |
| EP | 1989946 | A1 | 11/2008 |
| EP | 2159176 | A1 | 3/2010 |
| EP | 2443946 | A1 | 4/2012 |
| WO | 2005120614 | A1 | 6/2004 |
| WO | 2010045671 | A1 | 10/2009 |
| WO | 2013013808 | A1 | 7/2012 |
| WO | 2013025921 | A1 | 8/2012 |
| WO | 2012120487 | A2 | 9/2012 |
| WO | 2013034454 | A1 | 3/2013 |
| WO | 2013044537 | A1 | 4/2013 |
| WO | 2013075439 | A1 | 5/2013 |
| WO | 2013098405 | A2 | 7/2013 |
| WO | 2013102614 | A2 | 7/2013 |
| WO | 2015010292 | A1 | 1/2015 |

OTHER PUBLICATIONS

Anonymous, Third Party Observation for application No. EP20130003929, Jan. 30, 2019.

European Patent Office, Examination Report dated Apr. 16, 2018 in European Patent Application No. 13003929.0 of Fontem Holdings 1 B.V., 4 pages.

European Patent Office, Extended European Search Report for European Patent Application No. 19164600.9; Date of Mailing: Aug. 13, 2019; 7 pages.

European Patent Office, Extended European Search Report, for EP13003929.0, Feb. 7, 2014, 4 pgs.

European Patent Office, International Search Report, for PCT/EP14/001936, Oct. 10, 2014, 2 pgs.

European Patent Office, Office Action dated Jan. 14, 2022 for Application No. 19164600.9, 4 pages.

European Patent Office, Summons to Attend Oral Hearing with Preliminary Decision, Opposition of EP2835063, Mar. 9, 2021.

IP Office China, First Office Action for Patent Application No. 202010060125.9 dated Jan. 21, 2022, 14 pages.

IP Office China, First Office Action issued Feb. 2, 2018 in Chinese Patent Application No. 201480054763.2 of Fontem Holdings 1 B.V. 17 pages.

IP Office China, Second Office Action in Chinese Application No. 201480054763.2; Date of Mailing: Nov. 1, 2018; 10 pages.

IP Office China, Second Office Action of Chinese Application No. 202010060125.9; Date of Mailing: Aug. 8, 2022; 12 pages with English translation.

IP Office United Kingdom, Combined Search and Examination Report under Sections 17 and 18(3), for GB1410210.7, Dec. 10, 2014, 7 pgs.

JT International S.A., Opposition EP2835063 (Application 13003929.0), Jan. 9, 2020.

Monsees, James, et al., U.S. Appl. No. 61/524,308, filed Aug. 16, 2011.

Ordon Thomas, Screenshots of Youtube Video: https://www.youtube.com/watch?v=AXN07D04ZQo, Title: “Li ion pax ploom vaporizer battery safety”, publishing date: Apr. 25, 2013.

Ordon Thomas, Youtube Video: https://www.youtube.com/watch?v=AXN07D04ZQo, Title: “Li ion pax ploom vaporizer battery safety”, publishing date: Apr. 25, 2013.

Philip Morris, Opposition of EP2835063 (Application 13003929.0), Dec. 20, 2019.

Weickmann & Weickmann PartmbB, Opposition EP2835063 (Application 13003929.0), Jan. 10, 2020.

EPO, Second Office Action, for Application No. EP19164600.9; Mail date Feb. 2, 2023, 5 pages.

(56) References Cited

OTHER PUBLICATIONS

EPO, Third Office Action for Application No. EP19164600.9; Mail date Mar. 21, 2024, 4 pages.
EPO, extended European Search Report, for Application No. EP23150933.2; Mail date Mar. 31, 2023, 8 pages.
EP2835063 Opposition Decision and Druckexemplar Oct. 26, 2022.
EP2835063 Opposition Info re Oral Hearing and New Summons Dec. 16, 2021.
EP2835063 Opposition Interlocutory Decision Nov. 11, 2022.
EP2835063 Opposition Preliminary Decision Sep. 27, 2021.
EP2835063 Opposition Result of Oral Hearing Sep. 6, 2022.
EP2835063 Opposition Supp Arguments Aug. 25, 2021.
EP2835063 Opposition Supp Arguments Jul. 4, 2022.
EP2835063 Opposition Supp Arguments Aug. 2, 2022.
How Does an E Cig Work Oct. 25, 2011.
Mini E Cig Cig-A-Like Reviews Feb. 21, 2013.
Vapourlites Review Nov. 2, 2012.

* cited by examiner

ELECTRONIC SMOKING DEVICE

CROSS-REFERENCE TO RELATED APPLICATIONS

This application is a continuation of U.S. application Ser. No. 17/115,601, filed Dec. 8, 2020, which is a continuation of U.S. application Ser. No. 16/666,052, filed Oct. 28, 2019 and now U.S. Pat. No. 11,202,471, which is a continuation of U.S. application Ser. No. 14/910,618, filed Feb. 5, 2016 and now U.S. Pat. No. 10,492,529, which is a 371 National Stage Entry of International Application No. PCT/EP2014/001936, filed Jul. 15, 2014, which claims priority to European Patent Application No. 13003929.0, filed Aug. 6, 2013. These applications are incorporated herein by reference.

TECHNICAL FIELD

The invention relates to an electronic smoking device, in particular an electronic cigarette, and a process of manufacturing such an electronic smoking device.

SUMMARY

In the following, it is summarized how the electronic smoking device 70 according to the embodiment works.

The housing cap 74 can be removed from the housing sleeve 60 in order to get access to the reservoir 78. In the embodiment, the reservoir 78 is designed as a capsule closed on one end by an aluminum film. This aluminum film is pierced by a spike extending from the atomizer 76, when the reservoir 78 is mounted on the atomizer 76. Thereafter, the housing cap 74 can be placed on the housing sleeve 60 again. When the user sucks on the housing cap 74, a vacuum inside the housing sleeve 60 is created, which is sensed by the inhaling sensor 48 that transmits a corresponding signal to the control electronics on the circuit board 44. If a puff is detected, the electric heater in the atomizer 76 is switched on. The liquid from the reservoir 78 is fed by a metallic wick 73 to the area of the heater 75 so that it can be atomized, forming an aerosol. The aerosol leaves the atomizer area and is inhaled through the inhalation hole. The inhaling sensor 48 senses when the user stops sucking on the housing cap 74. In response thereto, the heater is switched off.

The battery 40, in the embodiment a rechargeable lithium ion battery, can be charged via charging port 42. The status of the electronic smoking device 70 (e.g., charging, standby, sucking, error) is indicated by the LEDs 46.

DETAILED DESCRIPTION

Figure 1:
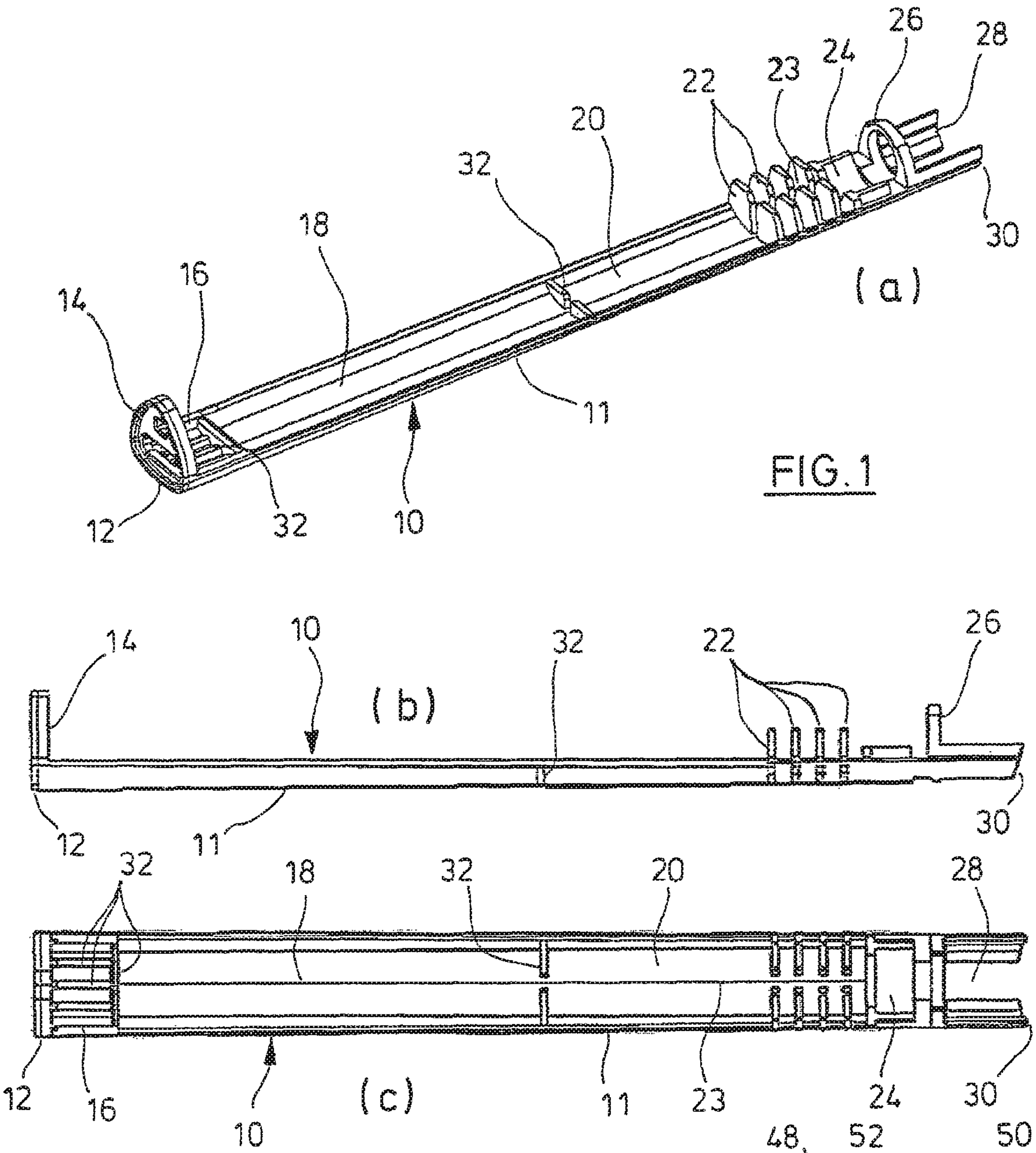
FIG. 1 is several views of an elongate insert of an embodiment of the electronic smoking device according to the invention, i.e. in part (a) a three-dimensional perspective view, in part (b) a side view and in part (c) a top view.

An electronic smoking device, e. g. designed as an electronic cigarette, generally comprises an elongate housing accommodating an electric power source (a battery, which often is re-chargeable), an electrically activatable atomizer adapted to atomize a liquid supplied from a capsule mounted at the electronic cigarette, and control electronics, e.g. a switch (in the form of a button or a sensor which senses a user's puff) and related circuitry. Actuation of the switch (e. g. by pressing the button or upon detection of a user's puff at a mouthpiece) causes a heater in the atomizer to be powered for a certain time. Here and in the following, the action of the atomizer is referred to "atomizing" and the related product is referred to as an "aerosol", irrespective of its composition, which might include gaseous and smoke constituents.

EP 2 443 946 A1 discloses an electronic cigarette and a capsule containing a liquid to be atomized (or evaporated) by an atomizer. The capsule comprises a shell which is sealed at one end by a puncturable membrane. To mount the capsule to the electronic cigarette, the capsule is inserted into a soft sleeve mouth piece and attached to the end of a tube accommodating the atomizer. When mounting, a spike provided at the end of a metal wick pierces the membrane, and the liquid of the capsule is guided by the wick to the atomizer. When the atomizer is activated, an aerosol is generated and the aerosol passes through some ducts provided at the exterior surface of the capsule to reach an end opening where it can be sucked by the consumer via the mouthpiece.

US 2011/0304282 A1 describes a power supply section for an electronic cigarette. This section comprises an elongate housing sleeve, which accommodates a rechargeable battery, a puff sensor for detecting an aerosol inhaling puff of a user, and control electronics connected to the puff sensor and adapted to control the heater of an atomizer. At an end of the housing sleeve a connector provides mechanical support for a portion of the electronic cigarette, which comprises the atomizer and holds a capsule containing a liquid to be atomized. The connector includes electrical connections for the atomizer.

Generally, it can be difficult to assemble components of an electronic smoking device, like a battery, a puff sensor and/or control electronics, in an elongate housing sleeve (e.g. as known from US 2011/0304282 A1), because such a sleeve permits access via a relatively small aperture at the end of the electronic cigarette. The assemblage can therefore be time consuming and potentially involves some risk of damage to the components.

The object of the invention is to provide an electronic smoking device, which can be manufactured in a more cost-effective and more reliable way, as well as a related process of manufacturing an electronic smoking device.

The electronic smoking device according to the invention comprises an elongate housing sleeve having a first end and a second end. The housing sleeve accommodates at least part of the following components: a battery, a puff detector, and control electronics. The battery is preferably a rechargeable battery such as a lithium ion battery, and serves as an electric power source for powering an electrically activatable atomizer. The puff detector is adapted to detect or indicate a user's desire for the creation of an aerosol for inhalation. Typically, this is achieved by the puff detector detecting a user taking a drag on the electronic smoking device. The control electronics are connected to the puff detector and are adapted to activate an electric heater included in the atomizer when a user indicates a desire for the generation of a puff of aerosol.

The atomizer is adapted to atomize a liquid supplied from a reservoir to generate an aerosol which can be inhaled by a user via the mouthpiece. Generally, when the puff detector detects that the user of the electronic smoking device is sucking on the device, the heater of the atomizer is operated, as long as the puff detector detects that the user is sucking on the device or for a predetermined time.

In the above context, "at least part" means that at least part of one of the listed components (battery, puff detector, control electronics) is accommodated in the housing sleeve, e. g. the battery and/or part of the control electronics (or the complete control electronics) and/or the puff detector. Additional components not listed may be contained in the housing sleeve as well. Parts not accommodated in the housing sleeve, including parts like the atomizer or the reservoir containing the liquid, may be arranged in a different portion or section of the electronic smoking device, i.e. a portion not comprising the housing sleeve.

According to the invention, the electronic smoking device comprises an elongate insert permitting lateral access and fitting into the housing sleeve via one of the ends of the housing sleeve. At least part of the following components may be mounted on the insert: the battery, the puff detector, the control electronics, the atomizer. Again, "at least part" means that at least part of one of the listed components (battery puff detector, control electronics, atomizer) is mounted on the insert, e.g. the battery and/or part of the control electronics (or the complete control electronics) and/or the puff detector. The atomizer (or part thereof) may be arranged on the insert a swell. But the atomizer can also be included in a different portion of the electronic smoking device, as described above.

Generally, the elongate insert is a component designed to aid the assemblage of the electronic smoking device. It provides a platform onto which internal parts or components can be mounted prior to insertion into the housing sleeve. The insert may include means (e.g. protrusions and/or depressions) that separate and immobilize the components to prevent internal migration and potential damage in typical use as well as noises when the device is shaken. Thus, the components mounted on the elongate insert can be fixed in a reliable manner. In this way, the stability of the electronic smoking device is generally improved.

Moreover, the elongate insert assists in correct internal positioning and alignment of the respective components. For example, LEDs (not yet mentioned above) may be mounted on the insert in a precise position so that they are correctly located when the electronic smoking device has been assembled, e.g. directly under light windows provided in the housing sleeve or, e.g., an end cap attached to the housing sleeve.

The elongate insert facilitates the manufacturing of the electronic smoking device because the elongate insert including the components mounted thereon can be easily inserted into the confined internal cavity provided by the housing sleeve via a small aperture provided at the end of the housing sleeve.

Moreover, after components have been mounted on the elongate insert and before the insert is inserted into the housing sleeve, these components can be conveniently tested, if desired. In case a component fails the test, it can be replaced without problems and in a cost-effective manner.

For example, the electronic components can be submitted to a final test after they have been assembled, positioned, connected and soldered together. Thus, failure rates can be largely reduced by identifying and fixing problems before the elongate insert is more or less irreversibly placed in the housing sleeve.

It is also conceivable that a major portion of the components of the electronic smoking device (e. g. including all or most of the electrical components) is assembled and/or tested on the elongate insert at one factory site, while the final assemblage of the electronic smoking device takes place at a different factory site.

Generally, when an electronic smoking device is manufactured according to the invention, an elongate housing sleeve having a first end and a second end and an elongate insert are provided. As long as the insert has not yet been placed into the housing sleeve, the insert permits access from a lateral side, so that at least part of components like a battery, a puff detector, control electronics and/or an atomizer (see above, also concerning the meaning of "at least part") can be mounted on the insert, via the lateral side of the insert. Afterwards, the insert including the components mounted thereon is fitted into the housing sleeve via one of the ends of the housing sleeve.

As explained above, a complete electronic smoking device as an electronic cigarette may include portions or sections in addition to the housing sleeve and the components contained therein. However, per definition the term "electronic smoking device" is also used for a device just including the housing sleeve and the components contained therein, because that device is related to electronic smoking and might be marketed separately.

In advantageous embodiments of the invention, the insert is designed, over at least 75% of its length measured in a longitudinal direction of the housing sleeve, as a partial shell adapted to an internal curvature of the housing sleeve. In a cross section of the housing sleeve, a partial shell extends over significantly less than 360°, e.g. over about 180° (half shell) or even less, which permits an easy lateral access to the elongate insert during assemblage of the components (before the insert is fitted into the housing sleeve) and which utilizes the space available for the components in an efficient manner.

Generally, the dimensions of the insert are dictated by the size of the housing sleeve. Given that tolerances are tight, it might be advantageous if the insert is as open as possible since that reduces the amount of space lost for functional equipment. That is to say, the design of the insert may be such that the minimum amount of space is lost because of having to accommodate the insert itself.

The under surface of the insert may be flat so that it can rest on a surface as the components are assembled and put into place on the insert, which facilitates the manufacture of the device since, for example, it would stop the battery from rolling about.

As already mentioned above, the insert can comprise protrusions (and/or depressions) adapted to immobilize the components mounted on the insert. Moreover, the insert may comprise at least one compartment wall. A compartment wall or ridge may assist, e. g., in shielding LED light so that the light is just visible at a desired location, e. g. a window, and/or in stabilizing light guides. Protrusions and/or compartment walls may also abut to the inner side of the housing sleeve after assemblage of the electronic smoking device, thus fixating the insert inside the housing sleeve against lateral movements.

The insert allows for much flexibility of the design. For example, a charging port can be mounted at one end of the insert, by definition at the first end of the insert, which is located at (i. e. in the area of) the first end of the housing sleeve when the insert is inside the housing sleeve. The charging port can be designed as, e.g. a micro USB port which would also allow for data transmission to the control electronics in case such function is supported. The charging port can be integrated in an end cap or end plate, which is attached to the insert and closes or even seals the first end of the housing sleeve in the fully assembled state of the device. Such end cap or end plate may further house a reset switch, e.g. to be used for transferring the control electronics into a well defined initial state.

In advantageous embodiments of the invention, the battery, the puff detector, and the control electronics are mounted on the insert, and a connector is mounted at a second end of the insert, which is located at (i.e. in the area of) the second end of the housing sleeve when the insert is inside the housing sleeve. The connector is adapted to provide a mechanical connection to another portion or section of the electronic smoking device, which comprises the atomizer. Moreover, the connector includes electrical connections for the atomizer. In this design, the housing sleeve houses most electrical components including the battery, which may be relatively large. Another portion of the device, which comprises the atomizer and which may support a liquid-containing capsule serving as a reservoir, is safely held by the connector, which also provides for the electrical connections to a heater of the atomizer. In this way, a modular set-up of the electronic smoking device is achieved, which generally facilitates the assemblage and is useful to the consumer in terms of spare parts. Another advantage is the possibility to provide, in a system, two sections with a housing sleeve and a battery so that one battery can be charged while the other one is in use.

The insert can also be utilized to mount or even integrate in the insert other components in addition to the basic components considered above.

For example, the insert can comprise at least one light guiding device. Such a light guiding device may comprise a light conductor, for example a light conductor directing light emitted from an LED placed on electronic circuitry to a window at the housing sleeve. Another example for a light guiding device is a light shielding wall or a pair of light shielding walls, which prevents light (emitted, e.g., by an LED placed on electronic circuitry) from illuminating any windows at the housing sleeve except for a certain window. This ensures a precise functional relation between light sources and exit windows for the light produced by the light sources. Such light guiding devices may also support the fixation between the elongate insert and the inner face of the housing sleeve.

Moreover, at least one electrical lead adapted to connect components mounted on the insert may be incorporated in the insert. In this way, loose wire connections can be avoided which could impede assemblage and could result in ill-defined gas flow passages. Generally, “printing” the electrical connections required for the control electronics, the battery and other electrical circuits directly onto the elongate insert will conserve space and remove the need for loose wires.

The puff detector can comprise a manually actuatable switch. Such switch can be pressed by the user as long as the user takes a puffin order to indicate that to the control electronics. Alternatively, upon pressing the switch, an initial signal is created which causes the control electronics to operate the heater of the atomizer for a predetermined period.

In other designs, the puff detector comprises an inhale sensor, which detects air flow or aerosol flow or a pressure drop inside the electronic smoking device, which is indicative for an aerosol inhaling puff, and causes the control electronics to power the heater of the atomizer. Again, the heater can be operated for a predetermined period or as long as the puff is sensed or detected. In the case of an inhale sensor, precise pressure conditions and/or flow resistances inside the housing sleeve may be important. The insert can assist in providing such conditions. For example, the insert may comprise a seal within the housing sleeve in order to separate different compartments from each other. Or the insert can be adapted to define a flow resistance within the housing sleeve, e.g. by defining an air flow passageway or by improving the homogeneity of air flow across components mounted on the insert in a well-defined manner.

In advantageous embodiments of the invention, the elongate insert irreversibly locks in the elongate housing sleeve when it is fitted into the housing sleeve. This can be accomplished, e.g., by means of a resilient claw engaging in a depression, and protects the electronic smoking device against unauthorized access. A similar effect can be achieved if the insert is glued to the housing sleeve.

In the embodiment, an electronic smoking device comprises an elongate housing sleeve which surrounds a major portion of the components of the electronic smoking device. This housing sleeve accommodates an elongate insert on which the components included in the housing sleeve are mounted.

FIG. 1 (*a*) shows a three-dimensional perspective view of the elongate insert of the embodiment, which is designated by reference numeral 10. FIG. 1 (*b*) is a side view and FIG. 1 (*c*) is a top view of the insert 10.

As shown in FIG. 1, the insert 10 is designed as an elongate partial or open shell 11 having a first end 12. At the first end 12, an end wall 14 rises from the shell 11. Going away from the end wall 14, the shell 11 provides a minor electronics area 16, a battery area 18, and a major electronics area 20. The major electronics area 20 comprises a plurality of walls 22 extending perpendicularly with respect to the longitudinal axis of the shell 11, which are grouped as pairs with a gap between both walls of each pair, see FIG. 1. These gaps each define a longitudinally extending slot 23. The next section of the shell 11 is formed by a sensor area 24, followed by a support ring 26. Finally, a connector area 28 is shaped at the second end of shell 11 designated by reference numeral 30.

The insert 10 includes a plurality of protrusions (and, consequently, depressions between the protrusions) which serve to immobilize or fix the components mounted on the insert 10. The walls 22 and the slot 23 are part of these protrusions and depressions, respectively. FIG. 1 shows additional protrusions, which are generally designated by reference numeral 32.

The insert 10 permits an easy lateral access because its shell 11 is open. That means, components of the electronic smoking device can be easily mounted and fixed on the insert 10, i.e. by gluing, clamping or simply by placing in between associated protrusions.

Figure 2:
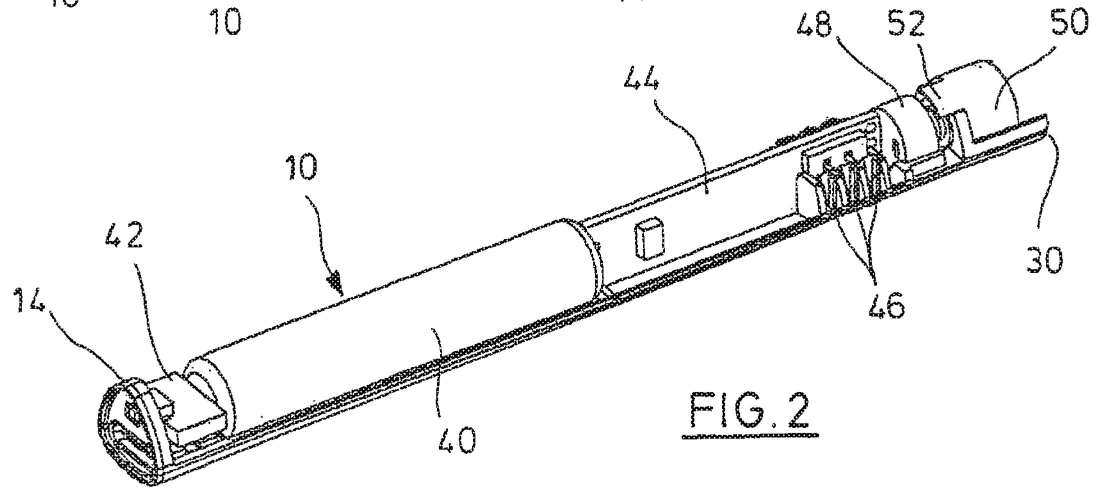
FIG. 2 is a three-dimensional perspective view of the insert according to FIG. 1 after components of the electronic smoking device have been mounted on the insert.

FIG. 2 shows the state after all the components to be mounted on the insert 10 have been placed in position. A battery 40 in the battery area 18 can be charged by means of a charging port 42 at the end wall 14 and related electronics in the minor electronics area 16. At the end wall 14, there is further provided a reset switch, which can be pressed by a user in order to achieve an initial state of the electronic smoking device. An electronic circuit board 44 which includes most of the control electronics of the electronic smoking device is held by the slot 23 formed between the walls 22. The circuit board 44 includes a total of six light-emitting diodes (LEDs), i.e. three on each side of the circuit board 44. The walls 22 form compartments, one for each LED 46, so that light emitted by a given LED cannot enter a compartment of a different LED.

Another component is a puff detector 48, which in this embodiment is an inhale sensor and is held in the sensor area 24 of shell 11. Finally, a female axial connector 50 in mounted in the connector area 28. A protrusion 52 fitting into a gap provided in the support ring 26 prevents the connector 50 from being rotated about the longitudinal axis of the device.

After the components have been mounted and fixed on the insert 10, as shown in FIG. 2, they can be connected, if required. For example, a wire can lead from the pole of the battery 40 located on the side of the charging port 42 to the other side of the battery 40 in order to be connected to the circuit board 44, and another wire connects the charging port 42 with the pole of the battery 40 located at the circuit board 44. It is conceivable that such wires are integrated in the insert 10 or that channels for accommodating such wires are provided in the insert 10.

After the components have been assembled, as shown in FIG. 2, and connected, i.e. by soldering, the set-up can be easily tested. In this state, it is easy and inexpensive to replace faulty components.

In the embodiment, the insert 10 is manufactured by injection-moulding in one piece and is made of acrylonitrile butadiene styrene (ABS). Any other suitable plastics material, e.g. poly (methyl methacrylate) (PMMA) or polycarbonate (PC), may be used as well.

It is also conceivable that the insert is composed of more than one piece. If the insert comprises light conductors, the light conductors may be formed, e. g., in one piece made of PMMA or PC, which is fixed to a main part of the insert made of, e.g., ABS.

Figure 3:
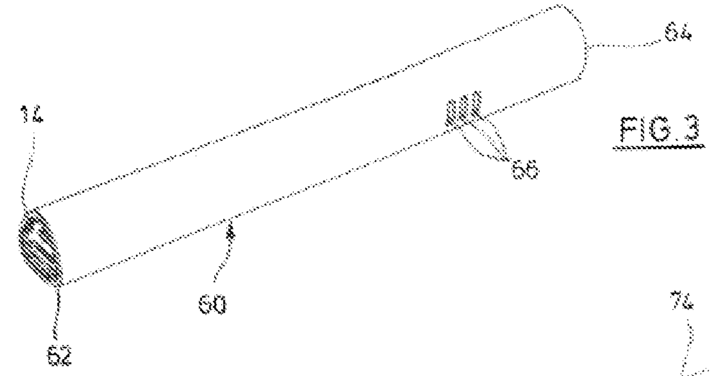
FIG. 3 is a three-dimensional perspective view of an elongate housing sleeve of the electronic smoking device after the insert including the components mounted thereon has been fitted into the housing sleeve.

In the next step of the assemblage of the electronic smoking device, the insert 10 including the components mounted thereon, as shown in FIG. 2, is fitted into an elongate housing sleeve 60, see FIG. 3. The housing sleeve 60 forms the major part of the housing of the electronic smoking device and is designed as a hollow shell having a first end 62 and second end 64. In the embodiment, the housing sleeve 60 is open both at its first end 62 and at its second end 64 so that the insert 10 can be moved into the housing sleeve 60 either via the first end 62 or via the second end 64. In advantageous embodiments, the insert 10 irreversibly locks inside the housing sleeve 60, i.e. by means of protrusions or claws emerging from one of the parts engaging in related depressions provided at the other part. In this case, only one of the ends of the housing sleeve 60 might be suitable for introducing the insert 10.

By being of a shape which extends across the extent of the aperture of the housing sleeve 60 into which the insert 10 is inserted, the end wall 14 causes the insert 10 to be aligned with the cavity defined by the housing sleeve 60. This then orientates the insert 10 so that it can be slid into place. The end wall 14 therefore protects the electronics components mounted on the insert 10 from being struck as the insert 10 is slid into place. The support ring 26 potentially has a similar effect.

Inside the housing sleeve 60, the insert 10 is stabilised against lateral movement by the end wall 14 and the support ring 26, both fitting to the internal wall shape of the housing sleeve 60.

FIG. 3 shows three windows 66 on one side of the housing sleeve 30. Another three windows are provided on the remote side. Each window 66 is associated with one of the LEDs 46. Because of the precise alignment of the insert 10 including the LEDs 46 and the housing sleeve 60, it is ensured that the light emitted from a certain LED 46 is shielded by the related walls 22 so that it can only penetrate one of the windows 66.

In the embodiment, the shape of the end wall 14 is that of a rounded triangle. It matches to the cross-sectional shape of the housing sleeve 60. This ensures that a particular orientation of the insert 10 is forced when it is inserted into the housing sleeve 60 and that the electronics components are aligned in a particular way, e.g. vis a vis the windows 66 or vis a vis any air ducts, etc.

Figure 4:
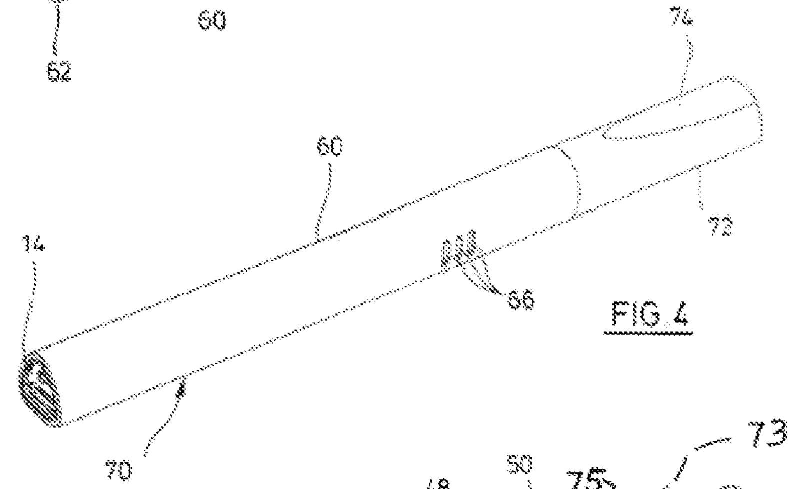
FIG. 4 is a three-dimensional perspective view of the complete electronic smoking device, which comprises the housing sleeve and a housing cap.

FIG. 4 illustrates the complete electronic smoking device, designated by reference numeral 70, according to the embodiment. In addition to the housing sleeve 60, the electronic smoking device 70 comprises a mouth-ended portion 72. The mouth-ended portion 72 includes a housing cap 74 provided with an inhalation hole at its free end (not visible in FIG. 4) and accommodating an atomizer and a reservoir filled with a liquid to be atomised.

Figure 5:
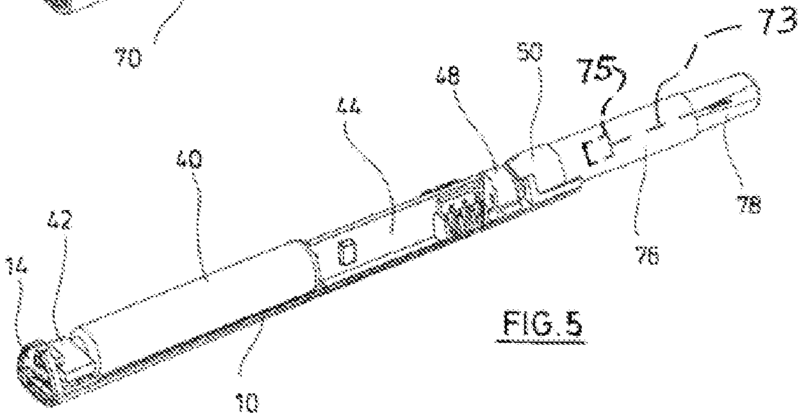
FIG. 5 is a three-dimensional perspective view of all the components inside the housing sleeve and the housing cap.

FIG. 5 displays all internal components of the electronic smoking device 70 in the absence of the housing sleeve 60 and the housing cap 74 for illustration purposes. Most of FIG. 5 is identical to FIG. 2. Additionally, FIG. 5 shows the atomizer (designated by 76) and the reservoir (designated by 78). The atomizer 76 is mounted on the connector 50 by means of a male axial connector (not shown in the Figures). This connection provides for a mechanical connection between both portions of the electronic smoking device 70, i.e. the portion defined by housing sleeve 60 and the mouth-ended portion 72. Moreover, it connects an electrical heating wire included in the atomizer 76 to the battery 40 and the control electronics provided on the circuit board 44.

In the embodiment, the material of the housing sleeve 60 is also ABS so that the material properties of the insert 10 and the housing sleeve 60 match to each other.

From the foregoing, it will be appreciated that specific embodiments of the invention have been described herein for purposes of illustration, but that various modifications may be made without deviating from the scope of the invention. Accordingly, the invention is not limited except as by the appended claims.

The invention claimed is:

1. An electronic smoking device, comprising;
- a housing sleeve having curved sleeve sidewalls and a non-round shape, and a capsule attachable to the housing sleeve, the capsule containing a liquid;
- an insert fitted into the housing sleeve through a first end or a second end of the housing sleeve, at least a portion of the insert having a flat bottom surface;
- the insert having curved insert sidewalls;
- the insert forming a battery compartment having an open top;
- a battery contained in the battery compartment;
- a charging port at the first end of the housing sleeve for charging the battery;
- a circuit board on the insert between the charging port and the battery;
- the capsule including an atomizer having a heater;

a connector at a connector area at a second end of the insert, opposite from the first end of the housing sleeve, the connector configured to electrically connect the battery to the heater;

a wick for providing the liquid to the heater for atomizing the liquid;

an inhalation hole in a housing cap on the capsule;

at least one LED indicator in a window of the housing sleeve; and a seal between the housing sleeve and the insert.

2. The electronic smoking device of claim 1 further including a support ring having a flat vertical surface at the second end of the insert.

3. The electronic smoking device of claim 1 wherein all electronic components within the housing sleeve are supported on the insert.

4. The electronic smoking device of claim 3 wherein the insert has a length of at least 75% of the length of the housing sleeve.

5. The electronic smoking device of claim 4 wherein the charging port is on an end plate of the insert.

6. The electronic smoking device of claim 1 wherein the insert irreversibly locks in the housing sleeve when it is fitted into the housing sleeve.

* * * * *